US006292812B1

(12) United States Patent
Hacker

(10) Patent No.: US 6,292,812 B1
(45) Date of Patent: Sep. 18, 2001

(54) SYSTEM FOR ISSUING AND DEVELOPING INVESTITURE CERTIFICATES AND OTHER DOCUMENTS

(75) Inventor: L. Leonard Hacker, 319 9th St. SE., Washington, DC (US) 20002

(73) Assignee: L. Leonard Hacker, Washington, DC (US)

(*) Notice: Subject to any disclaimer, the term of this patent is extended or adjusted under 35 U.S.C. 154(b) by 0 days.

(21) Appl. No.: 09/123,028

(22) Filed: Jul. 27, 1998

(51) Int. Cl.[7] .................................................. G06F 15/00

(52) U.S. Cl. ......................... 707/506; 707/517; 345/353; 705/1

(58) Field of Search ............................ 707/506, 517–521, 707/530, 526–527, 542; 345/353; 713/176, 168, 175, 200; 705/1, 76

(56) References Cited

U.S. PATENT DOCUMENTS 1,656,928 * 1/1928 Wheeler ................................ 283/74
2,520,077 * 8/1950 Wolowitz ............................ 101/369
3,541,960 * 11/1970 Dilsner et al. ...................... 235/487
3,930,924 * 1/1976 Oka et al. ........................... 156/277
3,994,225 * 11/1976 Sitzberger ........................... 101/369
4,523,777 6/1985 Holbein et al. ........................ 283/67
4,881,197 * 11/1989 Fischer ................................ 707/530
5,163,091 * 11/1992 Graziano et al. .................... 713/176
5,170,467 * 12/1992 Kubota et al. ....................... 707/520
5,289,573 * 2/1994 Kataoka et al. ..................... 345/353
5,559,945 * 9/1996 Beaudet et al. ...................... 345/353
5,615,123 * 3/1997 Davidson et al. ................... 700/233
6,021,202 * 2/2000 Anderson et al. .................... 380/25

* cited by examiner

*Primary Examiner*—Joseph H. Feild
(74) *Attorney, Agent, or Firm*—Roberts Abokhair & Mardula, LLC

(57) ABSTRACT

System for issuing and developing investiture certificates and other documents for highlighting and memorializing significant and special life events, and for conferring titles or standings. A series of logically connected/hyperlinked options permit the user to customize an investiture certificate or other document issued by the system. Such investiture certificates/documents may be produced on a variety of materials, including regular or fine paper, parchment, wood, glass, plastic, leather, etc. A first level of options includes borders, text, designs, and materials, and, optionally, surface finish. Second level options are tailored to each of the first level options. The present system produces a palpable representation of legally conferred titles and standings, and may only be issued upon the authorization of a person or entity having the authority to do so.

13 Claims, 13 Drawing Sheets

500

| | | |
|---|---|---|
| BORDERS 502 | SINGLE BORDER | AUNT 600 |
| | MUTIPLE BORDERS | UNCLE 602 |
| TEXT 504 | NAME | DADDY 604 |
| | COMMEMORATION | GRANDMA 606 |
| | AWARD/TITLE | GRANDPA 608 |
| | SIGNATURE | SISTER 610 |
| | OTHER(S) | STEP SISTER 612 |
| DESIGNS 506 | SINGLE DESIGN | GOD MOTHER 614 |
| | MULTIPLE DESIGNS | GOD FATHER 616 |
| MATERIAL 508 | LEATHER | |
| | PARCHMENT | |
| | FINE PAPER | |
| | REGULAR PAPER | |
| | GLASS | |
| | PLASTIC | |
| 540 | 542 | 550 |

FIG. 2

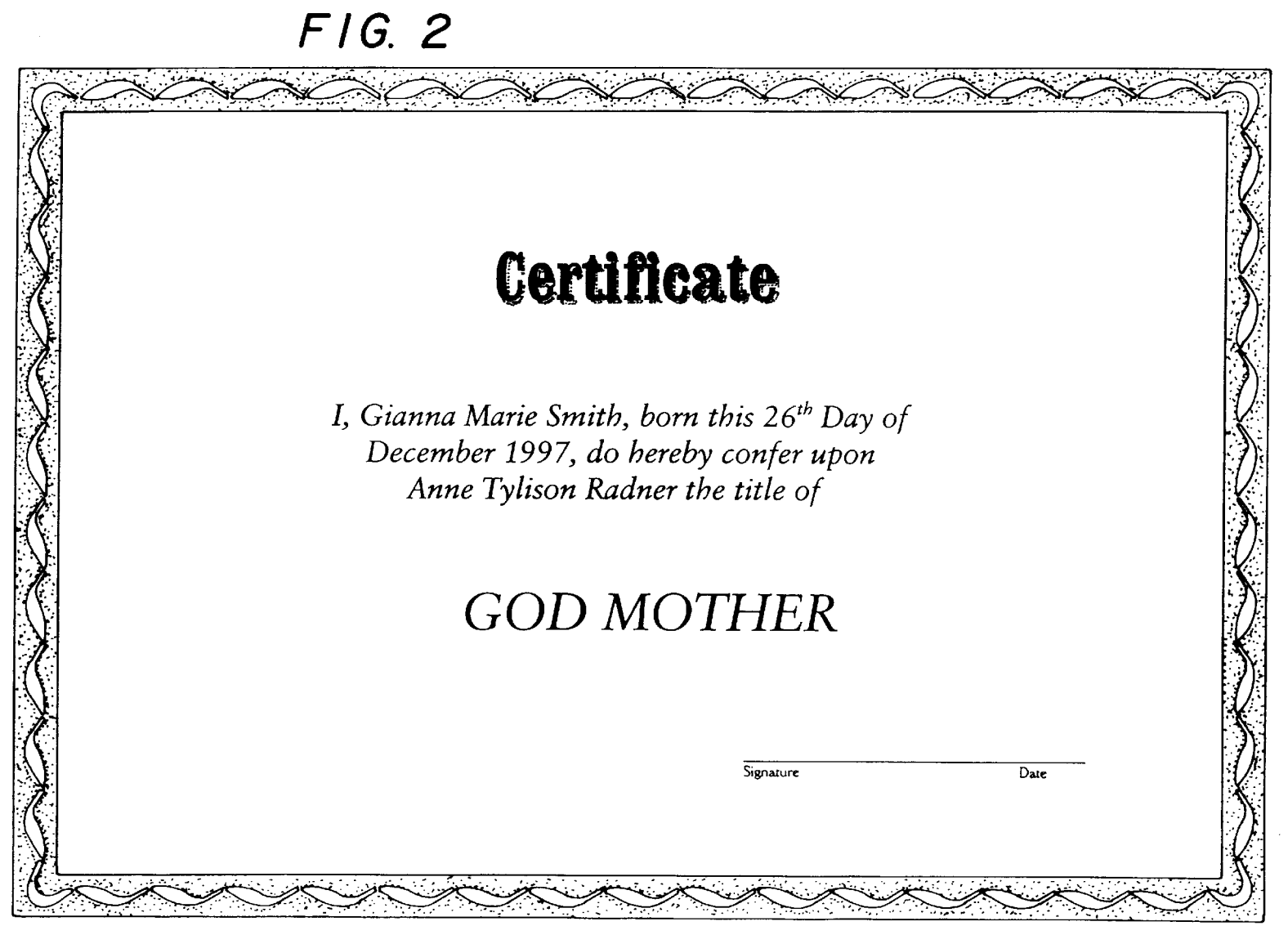

Certificate

*I, Gianna Marie Smith, born this 26$^{th}$ Day of December 1997, do hereby confer upon Anne Tylison Radner the title of*

GOD MOTHER

Signature Date

FIG. 3

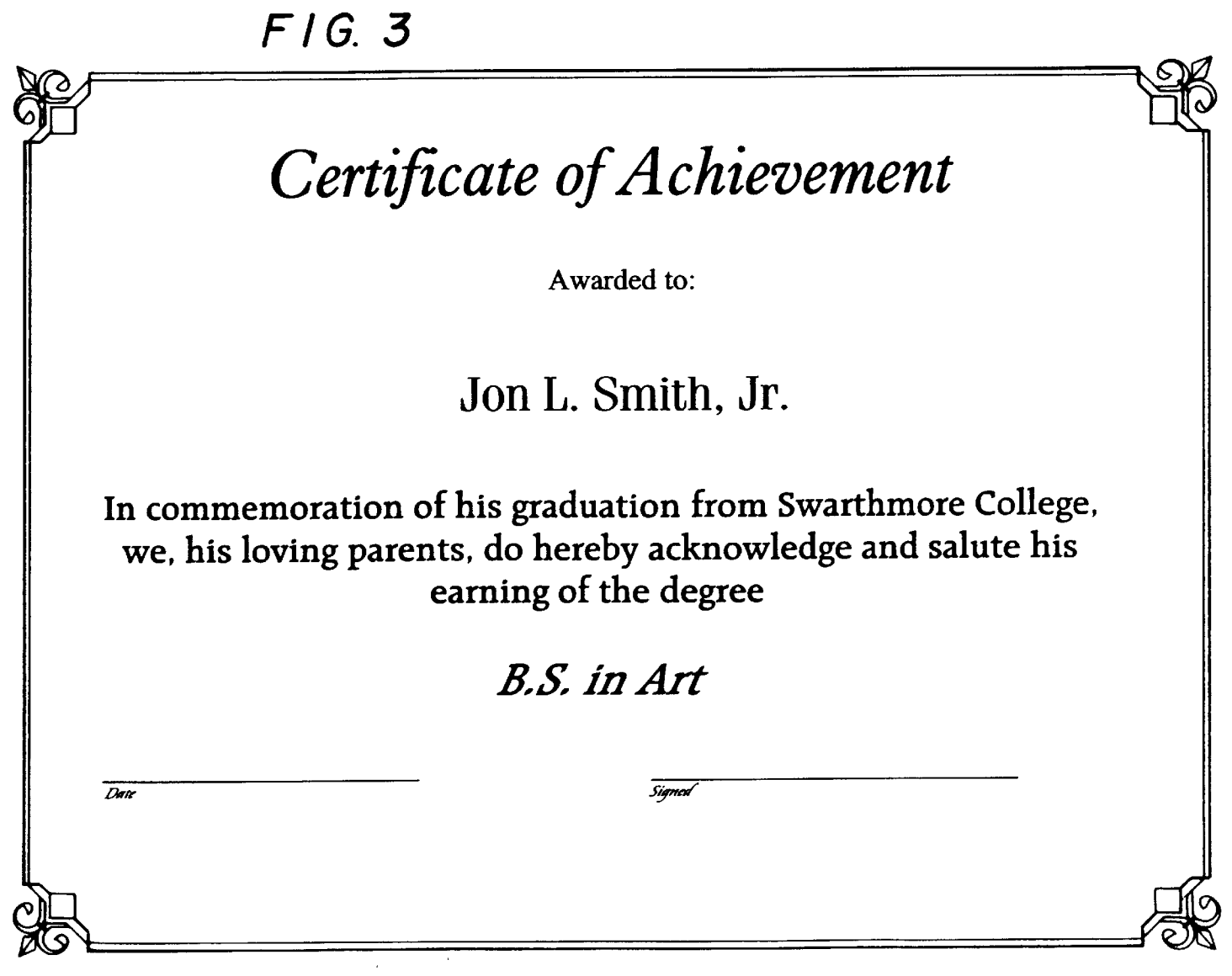

*Certificate of Achievement*

Awarded to:

Jon L. Smith, Jr.

In commemoration of his graduation from Swarthmore College, we, his loving parents, do hereby acknowledge and salute his earning of the degree

*B.S. in Art*

Date

Signed

FIG. 4

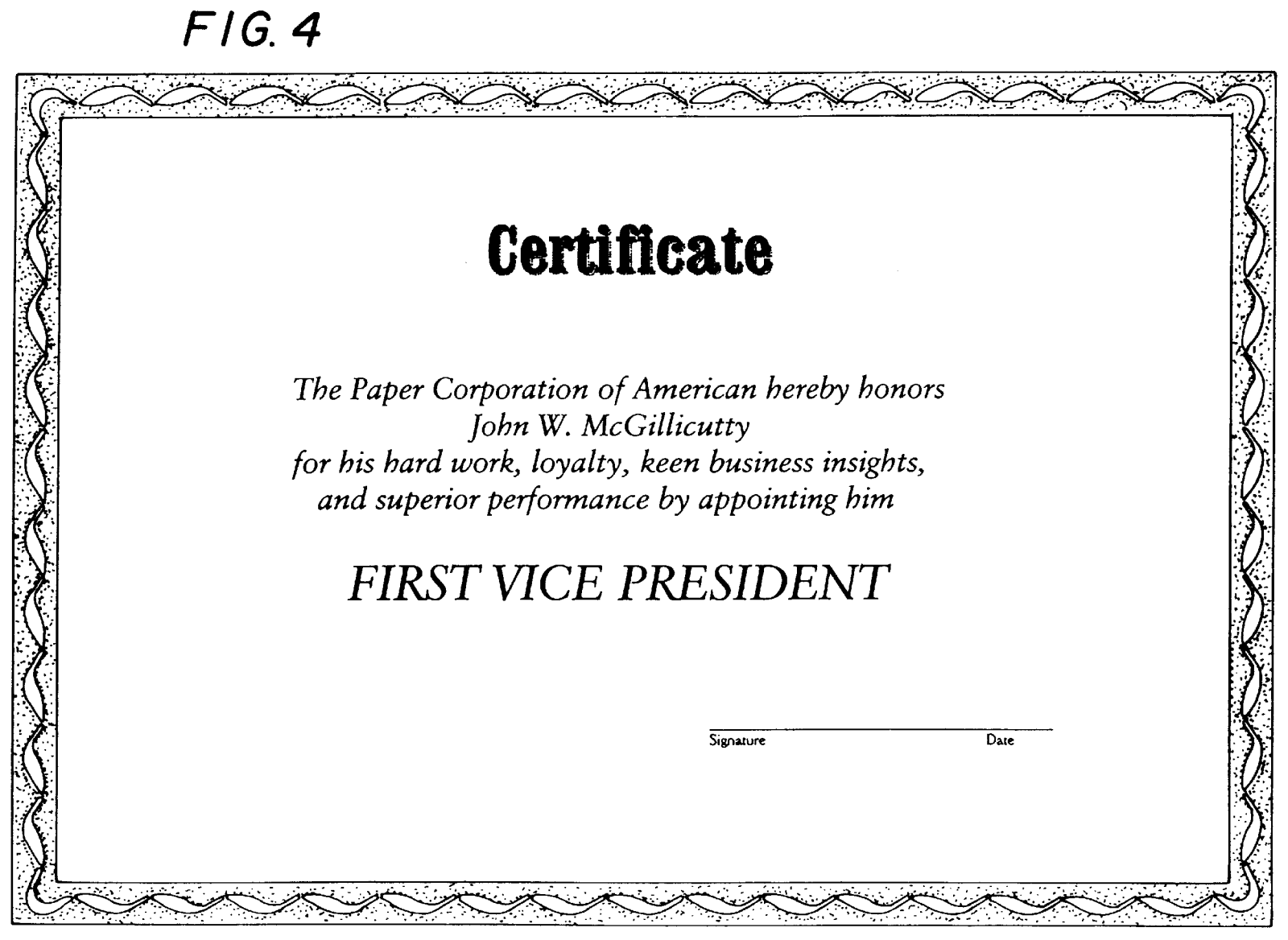

Certificate

*The Paper Corporation of American hereby honors*
*John W. McGillicutty*
*for his hard work, loyalty, keen business insights,*
*and superior performance by appointing him*

FIRST VICE PRESIDENT

Signature Date

| | | | |
|---|---|---|---|
| BORDERS 502 | SINGLE BORDER | 520 | |
| | MULTIPLE BORDERS | 522 | |
| TEXT 504 | NAME | 524 | |
| | COMMEMORATION | 526 | |
| | AWARD/TITLE | 528 | |
| | SIGNATURE | 530 | |
| | OTHER (S) | 532 | |
| DESIGNS 506 | SINGLE DESIGN | 534 | |
| | MULTIPLE DESIGNS | 536 | |
| MATERIAL 508 | LEATHER | 538 | |
| | PARCHMENT | 560 | |
| | FINE PAPER | 562 | |
| | REGULAR PAPER | 564 | |
| | GLASS | 566 | |
| | PLASTIC | 568 | |
| 540 | 542 | 544 | 550 |

FIG. 5B

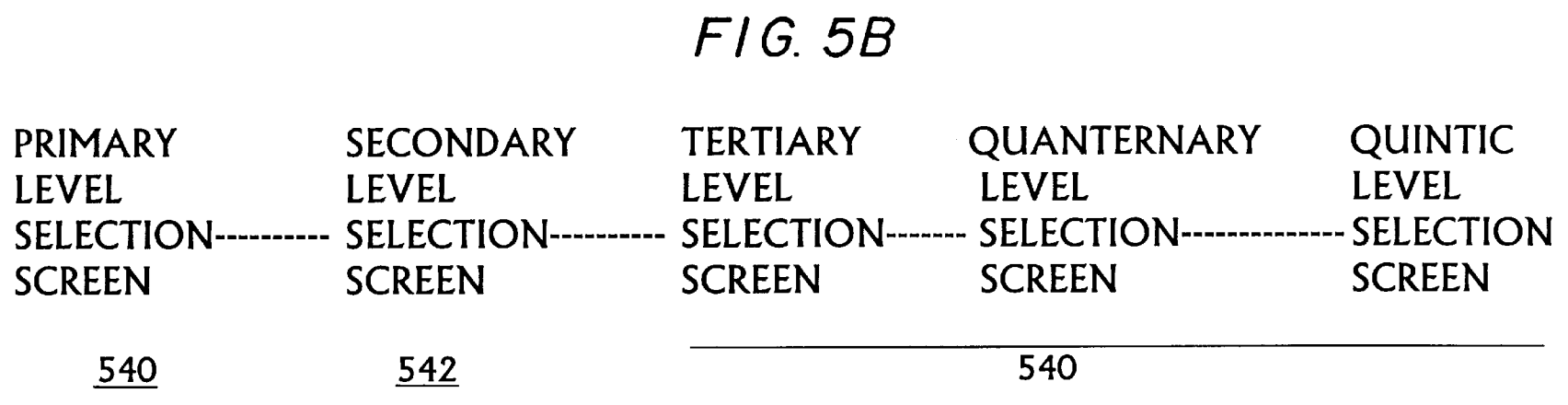

PRIMARY LEVEL SELECTION SCREEN 540 ---------- SECONDARY LEVEL SELECTION SCREEN 542 ---------- TERTIARY LEVEL SELECTION SCREEN ------- QUANTERNARY LEVEL SELECTION SCREEN -------------- QUINTIC LEVEL SELECTION SCREEN

| 540 | 542 | 550 | |
|---|---|---|---|
| BORDERS 502 | SINGLE BORDER | AUNT | 600 |
| | MUTIPLE BORDERS | UNCLE | 602 |
| TEXT 504 | NAME | DADDY | 604 |
| | COMMEMORATION | GRANDMA | 606 |
| | AWARD/TITLE | GRANDPA | 608 |
| | SIGNATURE | SISTER | 610 |
| | OTHER(S) | STEP SISTER | 612 |
| DESIGNS 506 | SINGLE DESIGN | GOD MOTHER | 614 |
| | MULTIPLE DESIGNS | GOD FATHER | 616 |
| MATERIAL 508 | LEATHER | | |
| | PARCHMENT | | |
| | FINE PAPER | | |
| | REGULAR PAPER | | |
| | GLASS | | |
| | PLASTIC | | |

FIG. 7

| | | |
|---|---|---|
| DESIGN | --- | 700 |
| GILDING | --- | 702 |
| EMBOSSING | --- | 704 |
| ENGRAVING | --- | 706 |
| COLOR | --- | 708 |
| CLIP ART | --- | 710 |

FIG. 8

| | | |
|---|---|---|
| CERTIFICATE | --- | 800 |
| CERTIFICATE OF ACHIEVEMENT | --- | 802 |
| ANNOUNCEMENT | --- | 804 |
| AWARD | --- | 806 |
| PROMOTION | --- | 808 |
| INVESTITURE CERTIFICATE | --- | 810 |

FIG. 9

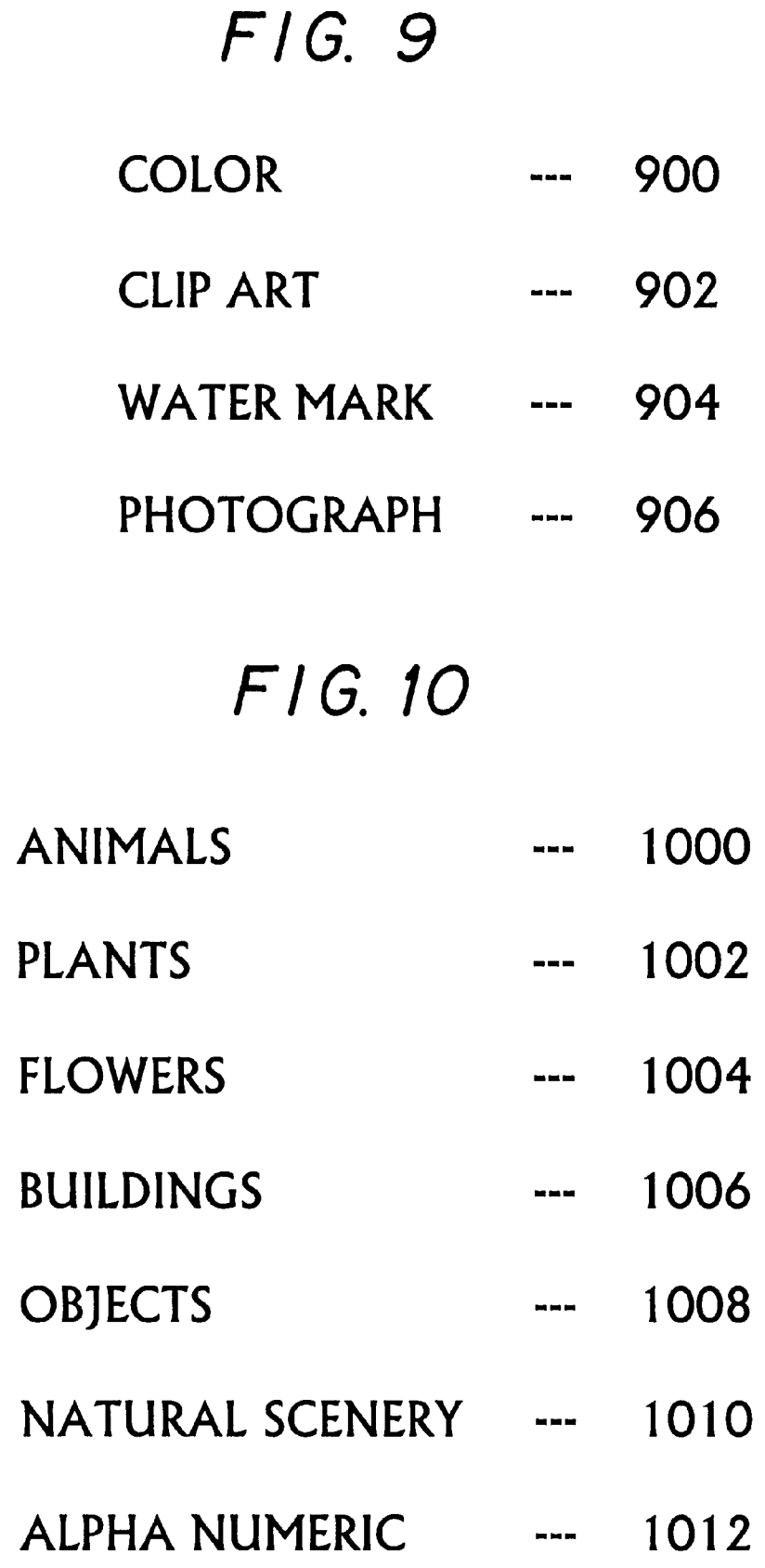

COLOR --- 900

CLIP ART --- 902

WATER MARK --- 904

PHOTOGRAPH --- 906

FIG. 10

ANIMALS --- 1000

PLANTS --- 1002

FLOWERS --- 1004

BUILDINGS --- 1006

OBJECTS --- 1008

NATURAL SCENERY --- 1010

ALPHA NUMERIC --- 1012

FIG. 11

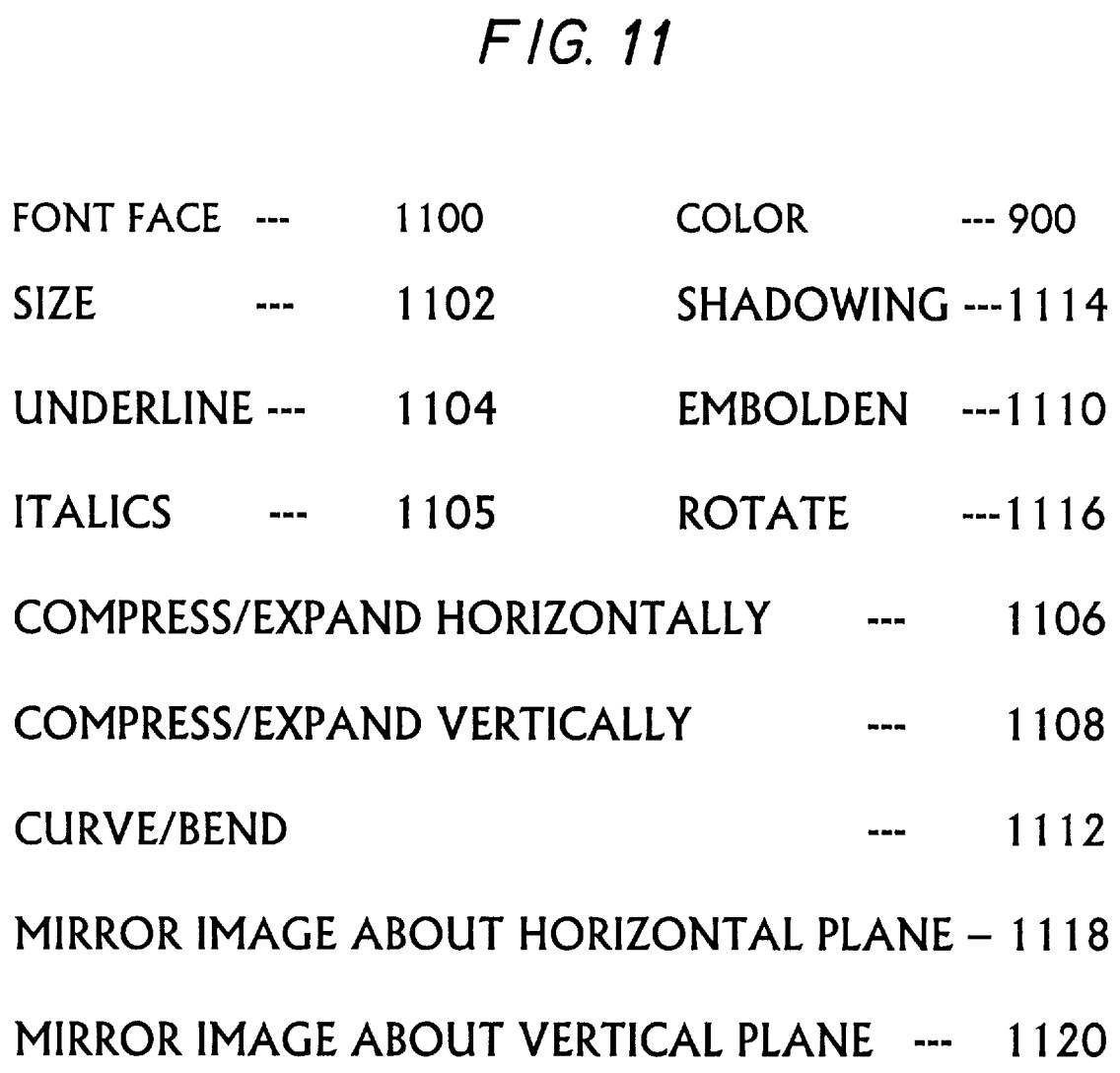

FONT FACE --- 1100

SIZE --- 1102

UNDERLINE --- 1104

ITALICS --- 1105

COLOR --- 900

SHADOWING ---1114

EMBOLDEN ---1110

ROTATE ---1116

COMPRESS/EXPAND HORIZONTALLY --- 1106

COMPRESS/EXPAND VERTICALLY --- 1108

CURVE/BEND --- 1112

MIRROR IMAGE ABOUT HORIZONTAL PLANE – 1118

MIRROR IMAGE ABOUT VERTICAL PLANE --- 1120

FIG. 12

| | | |
|---|---|---|
| COMPRESS/EXPAND HORIZONTALLY | --- | 1200 |
| COMPRESS/EXPAND VERTICALLY | --- | 1202 |
| CURVE/BEND | --- | 1204 |
| ROTATE | --- | 1206 |
| MIRROR IMAGE ABOUT HORIZONTAL PLANE | --- | 1208 |
| MIRROR IMAGE ABOUT VERTICAL PLANE | --- | 1210 |
| SIZE | --- | 1212 |
| SHADOWING | --- | 1214 |

FIG. 13

MATT ------------ 1300

GLOSS ----------- 1302

SEMI-GLOSS --- 1304

FLAT ------------- 1306

Know Ye All By These Present

Greetings By virtue of powers invested in us, we are delighted to confer the honorary and meritorious title of

GRANDFATHER upon

MOTHER GRANDCHILD FATHER

SYSTEM FOR ISSUING AND DEVELOPING INVESTITURE CERTIFICATES AND OTHER DOCUMENTS

FIELD OF THE INVENTION

The present invention relates generally to the production of investiture certificates and other documents. In particular, the present invention relates to the production and issuance of investiture certificates and other documents for the purpose of highlighting and memorializing significant and special life events, including the adoption or birth of a child.

DESCRIPTION OF THE KNOWN ART

United States patents which may relate generally to the design and production of certificates include the following. U.S. Pat. No. 1,656,928 to Wheeler discloses a process of producing superimposed embossing designs on plates and other articles of manufacture. The process consists of first embossing one design upon a base, followed by applying a coating to the embossed surface. The second design may then be embossed over the coated first design.

U.S. Pat. No. 2,520,077 to Wolowitz describes a way to produce an identification plate with an area bearing the customer's name, address, account number, and any other related constant or source data (for example, the amount of a sales transaction) in an arrangement in which such data are adapted to be printed directly onto a tabulating card. The tabulating card, in turn, is designed to decrease "human error" types of mistakes that tend to result from hand printing, for example, when transcribing data for accounting or other purposes.

U.S. Pat. No. 3,541,960 to Dilsner et al. discloses a method for enabling data to be encoded on printed record media simultaneously with the printing of uncoded information thereon and with the same equipment, such as a high speed computer printer. In addition, a means is provided for representing characters in coded form on record media without the use of special encoding equipment.

U.S. Pat. No. 3,930,924 to Oka, et al. discloses a method of making identification cards with engraved and unengraved parts, including characters and designs and/or embossings in black-and-white and/or color. The relative surface areas of the engraved and unengraved parts reflect various factors, including depths of engraving lines and points, color thickness and luster, etc., and determine the quality and characteristics of the resulting images.

U.S. Pat. No. 3,994,225 to Sitzber discloses a method of making a multitude of badges, each of which bears indicia common to all, as well as indicia unique and exclusive to each individual badge. Badge blanks are first imprinted with common indicia (for example, name of a convention or sponsoring organization), and subsequently additionally processed for unique indicia (for example, the wearer's name and company or organization) by electrostatic or photocopying processes.

U.S. Pat. No. 4,523,777 to Holbein, et al. discloses a means of making identification cards using lasers, chemical reactions, etc. A card carrier is first treated to produce thereon blue, green and red color layers—each only a few $\mu$m in thickness. Appropriate portions of each of the color layers are then vaporized off, using a controlled laser, to create the desired image. In addition, the laser can heat the card carrier portion to create "random" or unpredictable discoloration patterns so as to greatly increase the difficulty of counterfeiting. Similarly, chemical reactions can contribute to the visual effects of the final product.

U.S. Pat. No. 4,881,197 to Fischer discloses an interactive word processing system that permits the user flexibility in defining document geometry and data presentation characteristics (for example, embedded quotes, columns of numeric data, margins, tabs, paragraph indentations, use of italics, boldface, underlining, etc.) associated with non-contiguous portions of the document.

U.S. Pat. No. 5,170,467 to Kubota et al. discloses a method applicable to printing leaflets, catalogs, etc., where all of the processes are computer aided, including design and layout, production of color-separated films, preparing press/printing plates, proofing, and printing. This method permits easy modification at any stage up to the final printing.

U.S. Pat. No. 5,615,123 to Davidson, et al. discloses a method and apparatus for creating and producing custom card products, including greeting, commemorative and other cards, as well as invitations, business cards, stationery, address labels, legal forms, bumper stickers, calendars, plaques, books, certificates, directional signs, etc.

What is needed is a modern investiture certificate issuing system to facilitate the formal and/or "official" bestowal of titles and standings to commemorate important life events, such as the birth or adoption of a child or other especially significant event. Thus, there is a need for a system to issue and certify official titles, ranks, honors and standings in investiture certificate form.

SUMMARY OF THE INVENTION

It therefore is an object of the present invention to provide an investiture certificate developing and issuing system that legalizes the confirmation of a title by citing the authority, and highlights, enhances, embellishes and memorializes the commemorative process for a special event.

It is another object of the present invention to provide an investiture certificate developing and issuing system that legalizes the confirmation of a title by citing the authority, and formally bestows titles and standings to commemorate important events of one's life.

It is further object of the present invention to provide an investiture certificate developing and issuing system that legalizes the confirmation of a title by citing the authority, and permanently commemorating official titles, ranks, honors and standings.

It also is an object of the present invention to provide an investiture certificate developing and issuing system that legalizes the confirmation of a title by citing the authority, such that the titles, standings, etc., that are conferred are done so only by a person or entity with specific authority to do so, such as a son to a grandparent a daughter to an uncle, etc.

It is yet another object of the present invention to provide an investiture certificate developing and issuing system that legalizes the confirmation of a title by citing the authority, and, due to its diverse features and capabilities, enables the user to fashion investiture certificates reflecting a large range of styles and arrangement of elements to meet virtually any functional, stylistic or artistic need, including graphics (including calligraphy and "clip art" options), reproduction of photographs and art works, production of "water marks," embossing, gilding, engraving, etc.

It is yet a further object of the present invention to provide an investiture certificate developing and issuing system that legalizes the confirmation of a title by citing the authority, and permits the user to choose among a range of options as to the size of the issued investiture certificate and the material on which the investiture certificate is printed or otherwise reproduced.

The present invention fills the need for a modern investiture certificate issuing system, in particular a system that utilizes the many features and capabilities that are readily available with current software and hardware options. As but one example, when a child is born or adopted, upon exercise by the father, the present invention issues an official investiture certificate to one or more selected parties related to the child. Such official certificates relating to the birth of a child can be viewed as palpable representations of prescriptive rights, including, for the example of the birth of a child, such titles/standings as "aunt," "uncle," "grandfather," "grandmother," "god mother," "god father," "brother," "step brother" or "half brother," "sister," "step sister" or "half sister," "great aunt," "great uncle," "great grand father," "great grand mother," "cousin," etc. Such titles usually will constitute a legal standing, that, thereafter, "officially" can be used forever, and can only be created by a particular person or entity having proper authority, such as the father (including a sperm donor in an artificial insemination context), the mother, the surrogate mother, the physician who delivered the baby, the president or chairman of the board, the firm, etc. The official investiture certificates produced by the present system may further include graphic, artistic, photographic and highly stylized features (such as fancy calligraphy), as well as options as to the material on which the certificates are issued (for example, parchment, leather, fine paper, fabric, plastic, rubber, glass, etc.). The resulting documents are suitable for framing or other kinds of formal or informal display. The present invention also includes the issuing of investiture certificates relating to other life events, for example, graduation from high school, middle school, grade school, college, trade school, medical school, law school, etc., as well as achievement of certain significant benchmarks, such as tenure for a teacher or professor, promotion in the work place, achievement of a sales goal for an individual salesperson, a company, a division, a class, a school, a team, etc.

BRIEF DESCRIPTION OF THE DRAWINGS

FIG. 2 illustrates a sample certificate commemorating the birth of a child by conferring the title "GOD MOTHER."

FIG. 3 illustrates a sample certificate of achievement commemorating the graduation of a son from college.

FIG. 4 illustrates a sample certificate commemorating the promotion of a worker in a company.

FIG. 5-A illustrates a touch screen control panel showing first and second levels of options for producing certificates.

FIG. 5-B illustrates a summary of logic order relative to levels of options of logically connected touch screens.

FIG. 6 illustrates a touch screen control panel showing first and second level options for producing certificates, as well as third level options that are logically connected to second level option "Award/Title," which is logically connected to first level option TEXT.

FIG. 7 illustrates touch screen control third level options that are logically connected to second level options "Single Border" and "Multiple Borders," which, in turn, are logically connected to first level option "BORDERS."

FIG. 8 illustrates touch screen control third level options that are logically connected to second level option "Name," which, in turn, is logically connected to first level option "TEXT."

FIG. 9 illustrates touch screen control third level options that are logically connected to second level options "Single Design" and "Multiple Designs," which, in turn, are logically connected to first level option "DESIGNS."

FIG. 10 illustrates touch screen control fourth level options that are logically connected to third level options "Clip Art," "photograph," and "Water Mark," which, in turn, are logically connected to second level options "Single Design" and "Multiple Designs" of first level option "DESIGNS."

FIG. 11 illustrates touch screen control third level options that are logically connected to second level options "Commemoration," "Award/Title," "Signature," and "Others," which are logically connected to first level option "TEXT." In addition, these touch screen control options may function as fifth level touch screen control options by being logically connected to the third level options of FIG. 8.

FIG. 12 illustrates touch screen control fourth level options that are logically connected to third level options "Design," "Gilding," "Embossing," "Engraving," and "Clip Art" of FIG. 7. In addition, these touch screen options may serve as fourth level options that are logically connected to the third level options of FIG. 10.

FIG. 13 illustrates touch screen control fifth (or other) level options that are logically connected, for example, to fourth level options of FIG. 12 (BORDERS), or to fourth level options of FIG. 10 (DESIGN); or fourth level options that are logically connected to third level options of FIG. 11.

DESCRIPTION OF THE PREFERRED EMBODIMENTS

Figure 1:
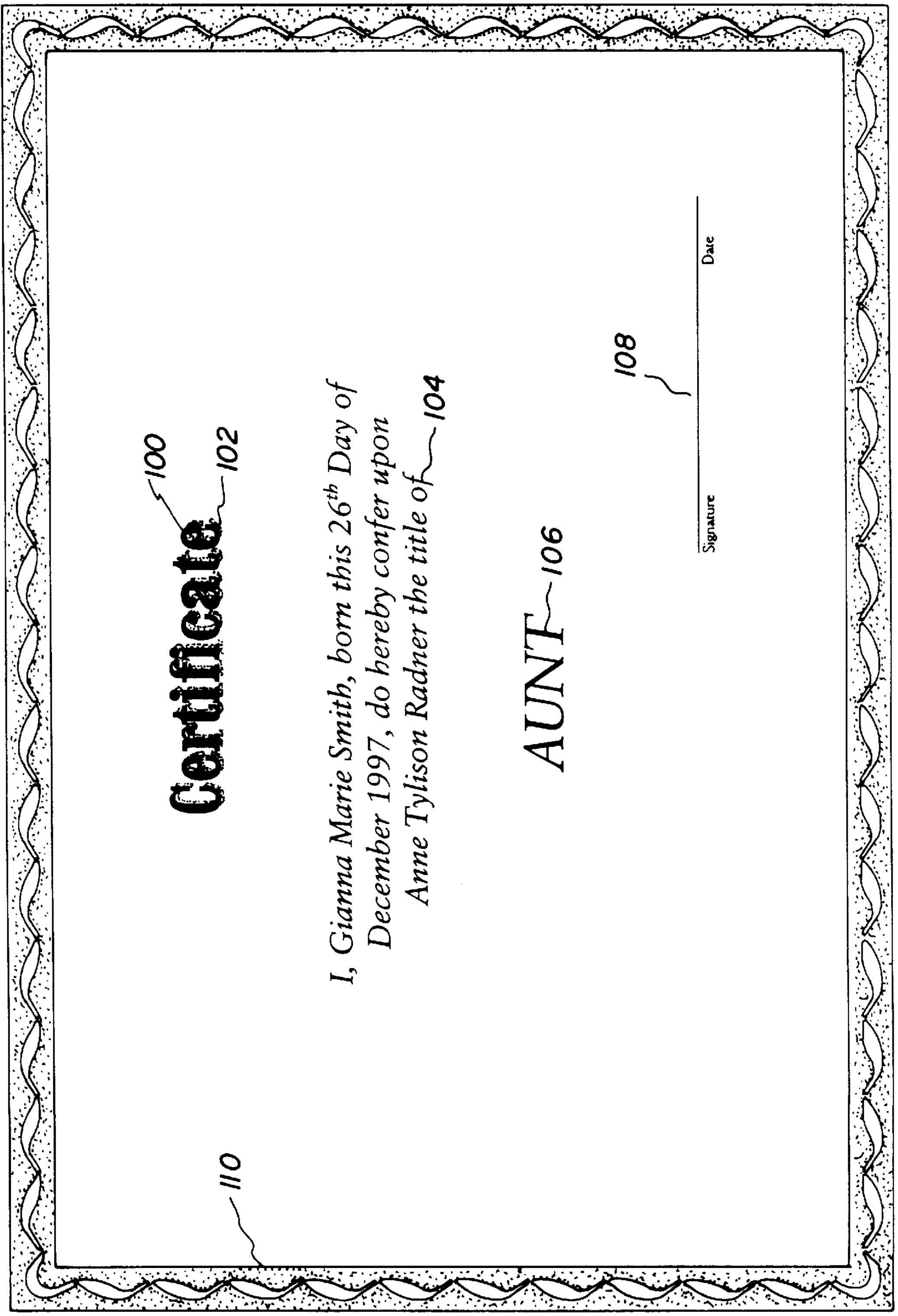
FIG. 1 illustrates a sample certificate commemorating the birth of a child by conferring the title "AUNT."

The scope of the present invention can be better understood by reference to the drawings. Referring to FIG. 1, parts of a possible certificate are shown, including Name or type of certificate area 100, Commemoration text area 104, Award/Title area 106, Signature area 108, single Border 110, and remaining areas that are available for Other text or graphics 112. Also shown is a graphics option Shadow 102, here used with the Name 100 of the certificate. The embodiment shown is designed to bestow the Award/Title of "Aunt" to Ms. Reynes of newborn Gianna Smith.

Referring to FIG. 2, an embodiment is shown in which newborn Gianna Smith bestows the Award/Title of "God Mother" to Ms. Radner.

Referring to FIG. 3, an embodiment is shown in which parents Jon and Sally Smith confer a title upon their son Jon, Jr. to commemorate his graduation from college.

Referring to FIG. 4, an embodiment is shown in which a company honors an employee by promoting him to the position "First Vice President."

Referring to FIG. 5-A, touch screen control panel 500 with nonlimiting first level features section 540, nonlimiting second level features section 542, and nonlimiting details section 550, which displays third, fourth and other levels of options based on selections made from first and second level sections 540 and 542, and from section 550 in the case of third, fourth, fifth, sixth, and seventh level features, etc. First level features section 540 presents nonlimiting first options BORDERS 502, TEXT 504, DESIGNS 506, and MATERIAL 508.

The first level BORDERS option 502 is used to control the style and number of borders 110, such as the Single Border embodiment shown in FIG. 1. Nonlimiting second level options Single Border selection 520 and Multiple Borders selection 522 (i.e., a series of one or more internal borders nested within an outermost border) are shown within second level features section 542.

Likewise, with respect to first level selection TEXT 504, representative and nonlimiting second level options are shown for Name 524 of the certificate selection (for specifying the name or type of certificate in area 100 of FIG. 1), Commemoration text selection 526 (for specifying the text used for the commemoration in area 104 of FIG. 1), Award/Title selection 528 (for specifying the award or title to be conferred or bestowed in area 106 of FIG. 1), Signature selection 530 (for specifying attributes for signature area 108 of FIG. 1), and Other text selection 532 (to be situated in other available space 112 of FIG. 1).

In addition, with respect to first level selection DESIGNS 506, second level options are shown for Single Design selection 534 (for a single design feature to be situated in other available space 112 of FIG. 1), and Multiple Design selection 536 (for a plurality of design features to be situated in other available space 112 of FIG. 1).

Furthermore, with respect to first level selection MATERIAL 508, exemplary and nonlimiting second level options are shown as Leather 538 (where leather refers to any material made from an animal skin or an animal's outer protective shell or other skin analog), Parchment 560, Fine Paper 562, Regular Paper 564, Glass 566, and Plastic 568. Additional options include Rubber, Stone, Metal, Wood (to include other nonlimiting plant-derived products, such as leaves and bark), Other (to include materials such as teeth, bones, etc.), and Mixed Material (to include two or more materials).

Referring to FIG. 5-B, the logic order is presented for options of logically connected touch screen selection panels (achieved, for example, by hyper-linking), for example, in reference to FIG. 5-A. The rank order is from highest order of level (first) to lowest order of level (second, third, fourth, fifth, sixth, seventh, or lower). Thus, in one embodiment, first level features BORDERS 502 and DESIGNS 506 of FIG. 5-A have two logically connected second level touch screen options, and first level features TEXT 504 and MATERIAL 508 have, respectively, five and six logically connected second level touch screen options. When a higher order level of touch screen selection is chosen by touching the screen area corresponding to that higher order level, the logically connected next-lower order level is activated (and, for example, also is highlighted to facilitate the user recognizing his options) to permit the user to select the options necessary to achieve his desired final product. The Windows® feature of computer software is an example of this kind of logical connection.

Referring to FIG. 6, an example is shown in which details screen section 550 is shown with representative and nonlimiting third level selections logically connected to second level Award/Title text selection 528 of FIG. 5-A. Other nonlimiting selections include such Awards/Titles as brother, half brother or step brother, sister, half sister or step sister, cousin, grand father, grand mother, great aunt, great uncle, great grand father, great grand mother, surrogate mother, vice president, chief executive officer or CEO, chief financial officer or CFO, treasurer, chief bottle washer, master chef, master mechanic, chief chef, etc. The third level selections shown in details screen section 550 of FIG. 6 appear automatically following the sequential selection of first level Text 504 and second level Award/Title 528 of FIG. 5-A.

Referring to FIG. 7, representative and nonlimiting third level Borders selections (for both Single and Multiple border selections) are shown with representative and nonlimiting third level selections for Design 700 (i.e., selection of the desired style and design elements), Gilding 702 (i.e., whether gold gilding is desired), Embossing 704, Engraving 706, Color 708, and Clip Art 710. With third level selections such as Embossing, Engraving and Color, fourth level selections logically connected thereto would include such representative and nonlimiting aspects as which areas of the border design are to be of which color, which areas are to be gilded, and which areas are to be engraved.

Referring to FIG. 8, representative and nonlimiting third level selections are shown for first—second logically connected selections TEXT 504—Name 524, which occupy area 100 in a certificate (FIG. 1). These selections would appear in the details or third level section 550 of a touch screen control panel following the sequential selection of first level TEXT 504 and second level Name 524. Nonlimiting examples shown are Certificate 800, Certificate Of Achievement 802, Announcement 804, Award 806, and Promotion 808.

Similar third level options would be available for Commemoration, Award/Title, Signature, and Other(s).

Referring to FIG. 9, representative and nonlimiting third level selections are shown for first level DESIGN, and would modify and/or create Single Design or Multiple Designs small areas within larger area 112 of a certificate (FIG. 1). Thus, representative and nonlimiting selections may be available as to Color 900, Clip Art 902, Water Mark 904, and Photograph 906. Alternatively, Color could be a selection in a fourth level selections list logically connected thereto, as could such options as "compress/expand horizontally," and "compress/expand vertically" (for example, see FIG. 12 below). The third level selections of FIG. 9 appear automatically in detail screen section 550 following the sequential selection of first level DESIGNS 506 and second level option either Single Design 534 or Multiple Design 536 of FIG. 5-A.

In an alternative embodiment, following selection of second level Multiple Designs 536, a third selection screen would appear in details section 550 of FIG. 5-A, including by way of nonlimiting example, selections such as "First Design," "Second Design," etc. In such an embodiment, the selections of FIG. 9 would become a fourth level of touch screen options, and additional options (such as those shown below in FIG. 12) could be logically connected to form a fifth or lower level of selection screen. Furthermore, additional levels of modifying options would apply to provide desired examples of Clip Art, Photographs, shapes of Water Marks, and Colors.

Referring to FIG. 10, representative and nonlimiting fourth level DESIGN 506 selections are presented for logically connected third level selections of FIG. 9. The featured options are Animals 1000, Plants 1002, Flowers 1004, Buildings 1006, Objects 1008, Natural Scenery 1010, and Alpha Numeric 1012. Other categories are also contemplated, such as stars and celestial bodies, abstract shapes, microscopic plant and animal anatomy, machines, trademarks, etc. In various alternative embodiments, such options may be shown as fifth level, sixth level, etc., touch screens. In addition, at least fifth level options would modify each of the above fourth level options so as to specify which kinds of animals, plants, etc.

Referring to FIG. 11, representative and nonlimiting third level TEXT 504 selections are presented for the logically connected second level selections 524–532 of FIG. 5-A, and include Font Face 1100, Size 1102, Underline 1104, Italics 1105, Color 900, Shadowing 1114, Rotate 1116, Compress/Expand Horizontally 1106, Compress/Expand Vertically 1108, Embolden 1110, Curve/Bend 1112, Mirror Image About Horizontal Plane 1118, and Mirror Image About Vertical Plane 1120. Other categories are also contemplated, such as multiple coloring for an individual alpha numeric character, gilding, engraving, etc.

Referring to FIG. 12, representative and nonlimiting fourth level BORDERS 502 selections are presented for the logically connected second level selections 520 (Single Border) and 522 (Multiple Borders) of FIG. 5-A, which in turn are logically connected to third level options 700–710 of FIG. 7. Thus, the Compress/Expand capabilities provided by selections 1200 and 1202 of FIG. 12 permit the user to stretch and compress clip art and other objects and elements to achieve desired special effects; and the other selection options similarly permit user manipulation for additional special effects.

Figure 13:
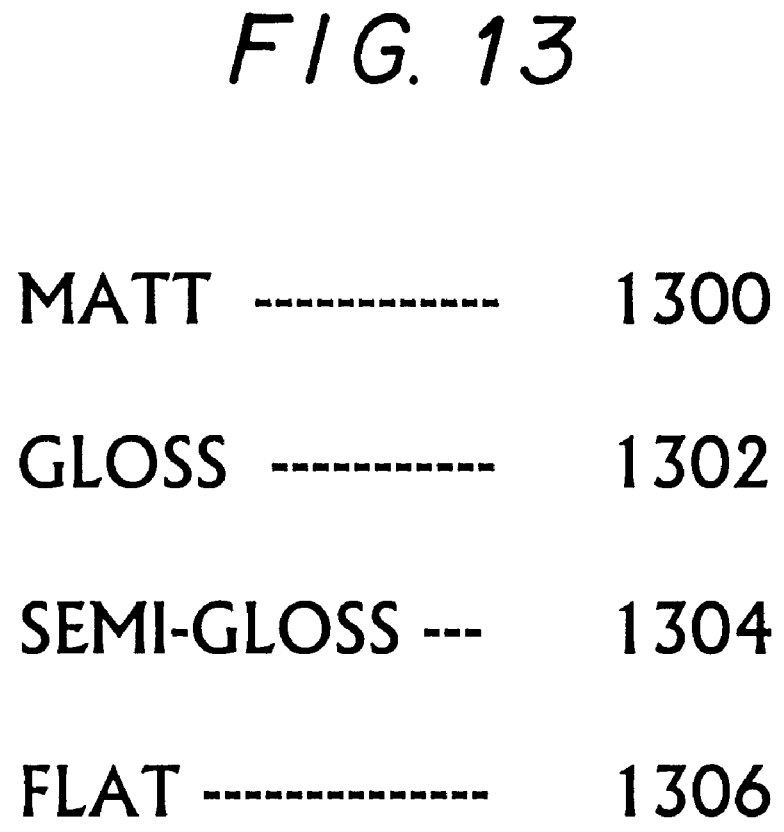

Referring to FIG. 13, representative and nonlimiting touch screen control fifth (or other) level options that are logically connected, for example, to fourth level options of FIG. 12 (BORDERS), or to fourth level options of FIG. 10 (DESIGN); or fourth level options that are logically connected to third level options of FIG. 11. Alternatively, or in addition, the touch screen control options of FIG. 13 may modify a feature labeled, for example, "Surface" or "Finish" that is logically connected (directly or indirectly via other logical connections) to MATERIALS; or the options of FIG. 13 may be logically connected (as a second level) to an additional first level option labeled, for example, "SURFACE" or "FINISH."

Figure 14:
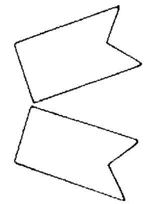
FIG. 14 illustrates a sample investiture certificate that confers the title "GRANDFATHER."

Referring to FIG. 14, an embodiment is shown in which a mother, a father, and a grand child confer the title "Grandfather." This embodiment illustrates additional creative elements, such as the choice of words, and type face.

The objectives of the present invention may be achieved by using computer software and hardware available in the marketplace, with programming or use of hyperlink producing software to create the hyperlinkages from one level of selection feature to the next. Printing, etching, gilding, embossing, and engraving (etc.) procedures may be effected by interfacing software with the capabilities described herein with machines for each desired mechanical feature by using software and hardware known in the art.

It is to be noted that the present invention includes a concept that is similar to the conferring of such titles as "Duke," "Earl," and "Knight" by a queen or king. However, in the present invention, persons, entities, and institutions other than a king or queen typically serve as the official authorizer of a title or standing.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art but are not expressly stated herein. These modifications, alterations and improvements are intended to be suggested hereby, and within the scope of the invention. As but one example, the levels of screens presented herein may be varied such that a third level touch screen becomes a fourth, fifth or sixth level touch screen; a fifth level touch screen becomes a third level touch screen; etc. Likewise, additional and/or different first and second level options are envisioned. Accordingly, the invention is limited only by the following claims, equivalents thereto, and inventions falling within the general scope of the present invention as interpreted in light of the present disclosure.

What is claimed is:

1. A method of creating and issuing an investiture certificate to a first party, comprising:

using a computer having a plurality of levels of logically connected selection features to customize an investiture certificate, further comprising:

selecting at least one first level selection feature; and for each first level selection feature, selecting at least one second level selection feature logically connected to the first level selection feature; and having a person or entity with specific authority issue said investiture certificate as a physical document to said first party to confirm, as between said person or entity with specific authority and said first party, a title that carries a family-related status, wherein said investiture certificate includes indicia of:

the title being confirmed;

said first party being confirmed with said title; and an authorization of the person or entity with specific authority to issue said title;

wherein said investiture certificate confirms a title selected from the group consisting of aunt, uncle, grandfather, grandmother, godmother, godfather, brother, step brother, half brother, sister, step sister, half sister, great aunt, great uncle, great grandfather, great grandmother, cousin, and surrogate mother.

2. The method of creating and issuing an investiture certificate according to claim 1, further comprising:

for each second level selection feature, selecting at least one third level selection feature logically connected to the second level selection feature.

3. The method of creating and issuing an investiture certificate according to claim 2, further comprising:

for each third level selection feature, selecting a fourth level feature logically connected to the third level selection feature.

4. The method of creating and issuing an investiture certificate according to claim 3, further comprising:

for each fourth level selection feature, selecting a fifth level selection feature logically connected to the fourth level selection feature.

5. The method of creating and issuing investiture certificates according to claim 4, further comprising:

for each fifth level selection feature, selecting a sixth level selection feature logically connected to the fifth level selection feature.

6. The method of creating and issuing investiture certificates according to claim 5, further comprising:

for each sixth level selection feature, selecting a seventh level selection feature logically connected to the sixth level selection feature.

7. The method of creating and issuing an investiture certificate according to claim 2, where the first level selection features are selected from the group consisting of BORDERS, TEXT, DESIGNS, and MATERIAL.

8. The method of creating and issuing an investiture certificate according to claim 7, where the second level selection features logically connected to the BORDERS first level selection feature are selected from the group consisting of Single Border and Multiple Borders.

9. The method of creating and issuing an investiture certificate according to claim 8, where the third level selection features logically connected to the Single Border and Multiple Borders second level selection features are selected from the group consisting of Design elements, Gilding, Embossing, Engraving, Color, and Clip Art.

10. The method of creating and issuing an investiture certificate according to claim 7, where the second level selection features logically connected to the TEXT first level selection feature are selected from the group consisting of Name, Commemoration, Award/Title, Signature, and Other.

11. The method of creating and issuing an investiture certificate according to claim 7, where the second level selection features logically connected to the DESIGNS first level selection feature are selected from the group consisting of Single Design and Multiple Designs.

12. The method of creating and issuing an investiture certificate according to claim 11, where the third level selection features logically connected to the Single Design and Multiple Designs second level selection features are selected from the group consisting of Color, Clip Art, Photograph, and Water Mark.

13. The method of creating and issuing an investiture certificate according to claim 7, where the second level selection features logically connected to the MATERIAL first level selection feature are selected from the group consisting of Leather, Parchment, Fine Paper, Regular Paper, Glass, Plastic, Rubber, Metal, Wood, and Mixed Material.

* * * * *